(12) United States Patent
Tsushima et al.

(10) Patent No.: US 9,490,603 B2
(45) Date of Patent: Nov. 8, 2016

(54) LASER APPARATUS AND METHOD OF CONTROLLING LASER APPARATUS

(71) Applicant: GIGAPHOTON INC., Oyama-shi, Tochigi (JP)

(72) Inventors: Hiroaki Tsushima, Oyama (JP); Osamu Wakabayashi, Oyama (JP); Takahito Kumazaki, Oyama (JP); Takashi Matsunaga, Oyama (JP)

(73) Assignee: GIGAPHOTON INC., Tochigi (JP)

( * ) Notice: Subject to any disclaimer, the term of this patent is extended or adjusted under 35 U.S.C. 154(b) by 33 days.

(21) Appl. No.: 14/638,883

(22) Filed: Mar. 4, 2015

(65) Prior Publication Data

US 2015/0180192 A1 Jun. 25, 2015

Related U.S. Application Data

(63) Continuation of application No. PCT/JP2013/073780, filed on Sep. 4, 2013.

(30) Foreign Application Priority Data

Sep. 7, 2012 (JP) .................................. 2012-197697

(51) Int. Cl.
*H01S 3/00* (2006.01)
*H01S 3/134* (2006.01)
(Continued)

(52) U.S. Cl.
CPC .............. *H01S 3/0014* (2013.01); *G01J 11/00* (2013.01); *H01S 3/034* (2013.01); *H01S 3/038* (2013.01); *H01S 3/134* (2013.01); *H01S 3/2251* (2013.01); *H01S 3/2256* (2013.01); *H01S 3/005* (2013.01);
(Continued)

(58) Field of Classification Search
CPC .... H01S 3/0014; H01S 3/038; H01S 3/2251; H01S 3/2256; H01S 3/034; H01S 3/134; H01S 3/08009; H01S 3/0971; H01S 3/225; H01S 3/2308; H01S 3/005; H01S 3/0069; G01J 11/00
See application file for complete search history.

(56) References Cited

U.S. PATENT DOCUMENTS 5,504,766 A * 4/1996 Watanabe ................. H01S 3/10
372/38.09
6,219,367 B1 4/2001 Atsumi
(Continued)

FOREIGN PATENT DOCUMENTS

JP 05291649 A 11/1993
JP 10275951 A 10/1998
(Continued)

OTHER PUBLICATIONS

International Search Report dated Nov. 26, 2013 corresponding to PCT/JP2013/073780.

*Primary Examiner* — Xinning Niu
(74) *Attorney, Agent, or Firm* — Studebaker & Brackett PC

(57) ABSTRACT

A laser apparatus may comprise: a laser chamber configured to include a laser gain medium; a pair of electrodes disposed in the laser chamber; an energy detector configured to measure pulse energy of laser beams outputted by discharging between the pair of the electrodes; an optical element disposed on a light path of the laser beams; and a controller configured to calculate an integration value of absorption energy at the optical element, and determine whether the integration value exceeds a lifetime integration value of the optical element based on the pulse energy of the laser beams.

6 Claims, 12 Drawing Sheets

(51) Int. Cl.
  *G01J 11/00* (2006.01)
  *H01S 3/034* (2006.01)
  *H01S 3/038* (2006.01)
  H01S 3/08 (2006.01)
  H01S 3/0971 (2006.01)
  H01S 3/225 (2006.01)
  H01S 3/23 (2006.01)
  H01S 3/10 (2006.01)

(52) U.S. Cl.
  CPC .......... *H01S 3/08009* (2013.01); *H01S 3/0971* (2013.01); *H01S 3/10069* (2013.01); *H01S 3/225* (2013.01); *H01S 3/2308* (2013.01)

(56) References Cited

U.S. PATENT DOCUMENTS

| | | | |
|---|---|---|---|
| 6,408,260 B1 | 6/2002 | Watts et al. | |
| 6,636,546 B2* | 10/2003 | Kakizaki | H01S 3/225 |
| | | | 372/57 |
| 6,687,562 B2 | 2/2004 | Patel et al. | |
| 6,697,695 B1 | 2/2004 | Kurihara et al. | |
| 7,203,562 B2 | 4/2007 | Patel et al. | |
| 2001/0012311 A1 | 8/2001 | Atsumi | |
| 2001/0036207 A1* | 11/2001 | Nagai | H01S 3/225 |
| | | | 372/20 |
| 2003/0223065 A1 | 12/2003 | Wang | |
| 2004/0042521 A1* | 3/2004 | Ariga | H01S 3/225 |
| | | | 372/55 |

FOREIGN PATENT DOCUMENTS

| | | |
|---|---|---|
| JP | 2000349017 A | 12/2000 |
| JP | 2002015986 A | 1/2002 |
| JP | 2002118311 A | 4/2002 |
| JP | 2004037439 A | 2/2004 |
| JP | 2004123420 A | 4/2004 |
| JP | 2002043219 A | 2/2008 |
| JP | 2008114228 A | 5/2008 |

* cited by examiner

FIG.9

| RANGE OF PULSE ENERGY E (mJ) | LIFETIME SHOT NUMBER OF OPTICAL ELEMENT Blife |
|---|---|
| 10>E | Ba |
| 10≤E<11.25 | Bb |
| 11.25≤E<13.75 | Bc |
| 13.75≤E<15 | Bd |
| 15≤E | Be |

LASER APPARATUS AND METHOD OF CONTROLLING LASER APPARATUS

CROSS-REFERENCE TO RELATED APPLICATION

This application is a continuation of PCT International Application No. PCT/JP2013/073780 filed on Sep. 4, 2013 which claims the benefit of priority from Japanese Patent Application No. 2012-197697, filed on Sep. 7, 2012; the entire contents of which are incorporated herein by reference.

BACKGROUND

1. Technical Field

The present disclosure relates to a laser apparatus and a method of controlling a laser apparatus.

2. Related Art

In recent years, for a semiconductor exposure apparatus (hereinafter referred to as an exposure apparatus), a higher resolution is being required as miniaturization and integration of a semiconductor integrated circuit have been progressed. Therefore, wavelength-shortening of light outputted from an exposure apparatus has been developed. Generally, as an exposure apparatus, a gas laser apparatus is used instead of the traditional mercury lamp. For example, as a gas laser apparatus for exposure, a KrF excimer laser outputting an ultraviolet laser beam with 248 nm (nanometer) wavelength or an ArF excimer laser outputting an ultraviolet light beam with 193 nm wavelength may be used.

In a next generation exposure technology, an immersion exposure in which a gap between an exposure lens in an exposure apparatus and a wafer is filled with fluid has been put to practical use. In the immersion exposure, because refraction index between the exposure lens and the wafer is changed, an apparent wavelength of the exposure light source is shortened. In a case where an immersion exposure is conducted using an ArF excimer laser as an exposure light source, a wafer is irradiated with an ultraviolet light beam of which wavelength is equivalent to 134 nm. Such technique may be called as an ArF immersion exposure (or an ArF immersion lithography).

Natural oscillation amplitudes of a KrF excimer laser and an ArF excimer laser are wide such as about 350 to 400 pm (picometer). Therefore, when a projector lens is made by a material which transmits an ultraviolet light beam such as a KrF laser beam or an ArF laser beam, a chromatic distortion may occur. As a result, a resolution may be reduced. Therefore, a spectrum line width of a laser beam outputted from a gas laser apparatus should be narrowed to the extent a chromatic distortion can be ignored. In order to narrow a spectrum line width, in a laser resonator of a gas laser apparatus, a line narrow module (LNM) with a line narrowing element (an etalon, a grating, or the like) may be mounted. In the following, a laser apparatus of which spectrum line width is narrowed may be called as a line narrowed laser apparatus.

SUMMARY

A laser apparatus according to one aspect of the disclosure may comprise: a laser chamber configured to include a laser gain medium; a pair of electrodes disposed in the laser chamber; an energy detector configured to measure pulse energy of laser beams outputted by discharging between the pair of the electrodes; an optical element disposed on a light path of the laser beams; and a controller configured to calculate an integration value of absorption energy at the optical element, and determine whether the integration value exceeds a lifetime integration value of the optical element based on the pulse energy of the laser beams.

A laser apparatus according to another aspect of the disclosure may comprise: a laser chamber configured to include a laser gain medium; a pair of electrodes disposed in the laser chamber; an energy detector configured to measure pulse energy of laser beams outputted by discharging between the pair of the electrodes; an optical element disposed on a light path of the laser beams; and a controller configured to, with respect to the optical element, calculate a lifetime shot number with respect to the laser beams with the pulse energy based on the pulse energy of the laser beams, calculate a lifetime index value by integrating inverses of the respective calculated lifetime shot numbers, and determine whether the lifetime index value exceeds 1 or not.

A control method of a laser apparatus according to yet another aspect of the disclosure include: discharging a pair of electrodes for exciting a laser gain medium by applying voltages between the pair of the electrodes in order to output laser beams; measuring pulse energy of the outputted laser beams; calculating an integration value of absorption energy at an optical element disposed on a light path of the laser beams based on the pulse energy of the laser beams; and determining whether the integration value of absorption energy exceeds a lifetime integration value of the optical element or not.

A control method of a laser apparatus according to yet another aspect of the disclosure include: discharging a pair of electrodes for exciting a laser gain medium by applying voltages between the pair of the electrodes in order to output laser beams; measuring pulse energy of the outputted laser beams; calculating, with respect to an optical element disposed on a light path of the laser beams, a lifetime shot number with respect to the laser beams with the pulse energy based on the pulse energy of the laser beams; calculating a lifetime index value by integrating inverses of the respective calculated lifetime shot numbers; and determining whether the lifetime index value exceeds 1 or not.

BRIEF DESCRIPTION OF THE DRAWINGS

Hereinafter, selected embodiments of the present disclosure will be described with reference to the accompanying drawings.

FIG. 9 is an illustration for explaining a fifth control method of the laser apparatus according to the disclosure;

DETAILED DESCRIPTION

Figure 1:
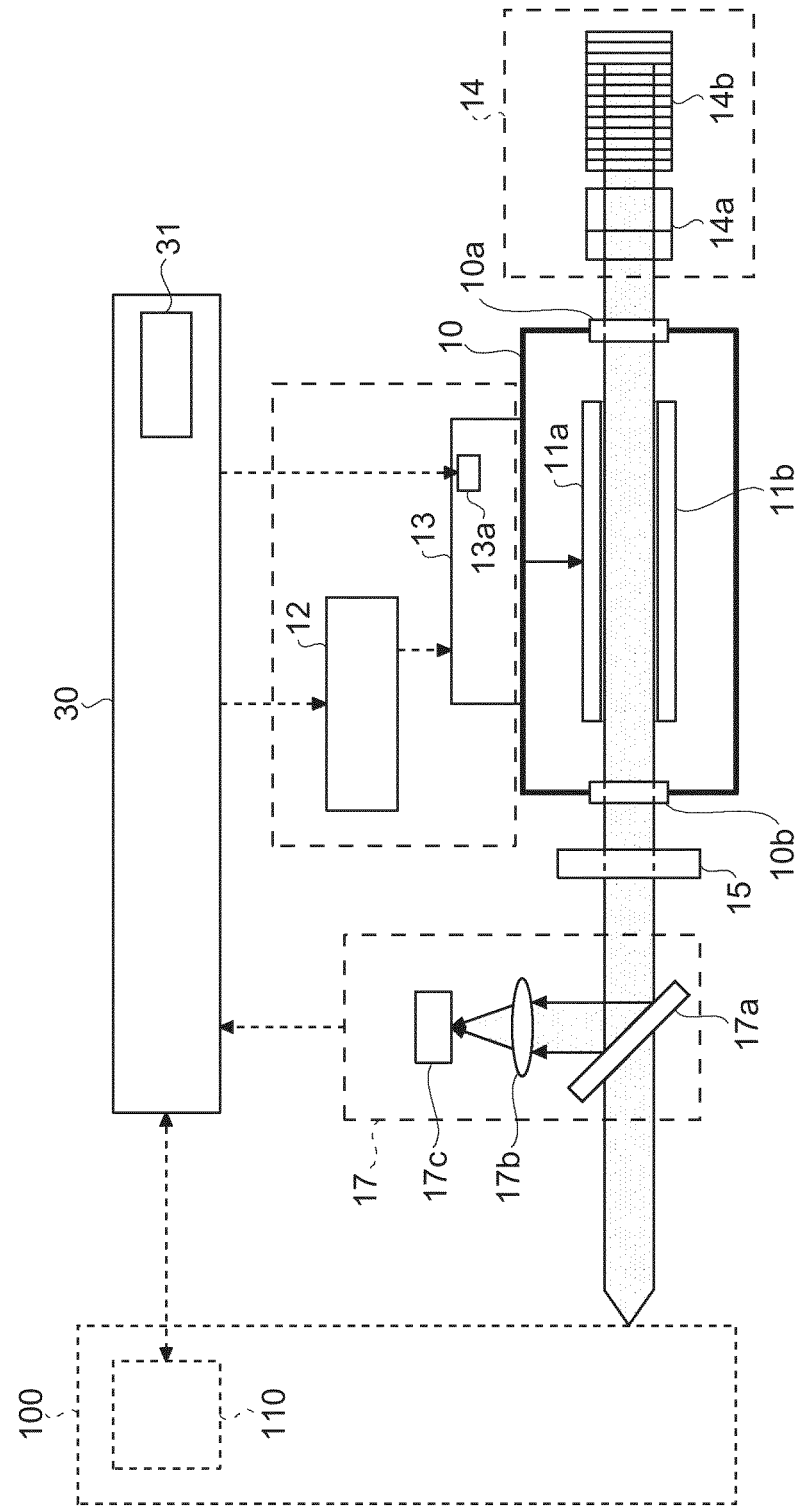
FIG. 1 is a structural diagram showing a laser apparatus according to the disclosure.

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein. The embodiments of the present disclosure will be described following the table of contents below.

Contents
1. Excimer laser apparatus
    1.1 Popularity
    1.2 Structure
    1.3 Operation
2. Lifetime estimation method of optical element in excimer laser apparatus
    2.1 Estimation and parameter of lifetime of optical element
    2.2 First lifetime estimation method of optical element
    2.3 Second lifetime estimation method of optical element
    2.4 Third lifetime estimation method of optical element
    2.5 Estimation method based on relational expression between pulse energy and lifetime of optical element (fourth lifetime estimation method of optical element)
    2.6 Fifth lifetime estimation method of optical element
3. Lifetime estimation method of optical element in double chamber system
    3.1 Structure
    3.2 Operation
    3.3 Specific lifetime estimation method of double chamber system 1. Excimer Laser Apparatus
1.1 Popularity Generally, a discharge excitation gas laser apparatus for a semiconductor exposure apparatus being an excimer laser apparatus may be required to stably output desired pulse laser beams for a long period of time. However, when the excimer laser oscillates for a long period of time, there is a case where an optical element reaches the end of lifetime due to deterioration of transmissivity thereof, or the like, and thereby, a pulse laser beam with desired energy cannot be outputted.

Such lifetime of an optical element may be estimated based on whether a total pulse number of pulse laser beams outputted from a laser chamber reaches a predetermined threshold or not. However, because the lifetime of the optical element may change depending on energy of laser beams outputted from the laser chamber, when the lifetime is estimated based only on the total pulse number of pulse laser beams, it may be impossible to estimate an accurate lifetime of the optical element.

That is, conventionally, a lifetime of an optical element, a module, or the like, installed in the excimer laser apparatus may be estimated based on a total number of pulse laser beams. However, currently, an excimer laser apparatus capable of changing pulse energy outputted therefrom within a range of 10 mJ to 20 mJ is required. In such excimer laser apparatus, because a lifetime of an optical element changes based on input energy, i.e., a voltage applied between a pair of electrodes in the excimer laser apparatus and pulse energy of outputted laser beams, it is impossible to estimate the accurate lifetime of the optical element based only on the total number of pulse laser beams. Therefore, it is required for a laser apparatus to be capable of estimating a lifetime of an optical element as accurately as possible against changes of pulse energy of outputted laser beams.

1.2 Structure

FIG. 1 shows an excimer laser apparatus according to one aspect of the disclosure. The excimer laser apparatus may include a laser chamber 10, a charger 12, a pulse power module (PPM) 13, a laser resonator, an energy monitor unit 17 and a controller 30. The controller 30 may include a storage 31. In the disclosure, "excimer laser apparatus" may be simply referred to as "laser apparatus".

The laser chamber 10 may include a pair of electrodes 11a and 11b, and two windows 10a and 10b capable of transmitting laser beams. The laser chamber 10 may include a laser gas being a laser gain medium.

The laser resonator may include a line narrowing module (LNM) 14 and an output coupler (OC) 15. An alternative of the laser apparatus may include a high reflection minor instead of the LNM 14. The laser chamber 10 may be disposed on a light path of the laser resonator.

The LNM 14 may include a prism 14a and a grating 14b. The prism 14a may expand a width of a laser beam. The grating 14b may be arranged in Littrow so that the laser apparatus oscillates at a target wavelength.

The OC 15 may be a partial reflection minor capable of reflecting a part of a laser beam and transmitting a part of the laser beam.

The energy monitor unit 17 may include a beam splitter 17a disposed on a light path of a laser beam having been passed through the OC 15, a collector lens 17b and an optical sensor 17c. In the disclosure, the optical sensor 17c may be also referred to as an energy detector. An energy value of a laser beam entering the OC 15 can be calculated based on a value measured by the optical sensor 17c.

The PPM 13 may include a capacitor and a switch 13a, and be connected to the electrodes 11a and 11b. By applying a trigger signal from the controller 30 to the switch 13a, discharge may occur between the electrodes 11a and 11b. The charger 12 may be connected to the capacitor in the PPM 13.

1.3 Operation

The controller 30 may receive a target pulse energy Et and trigger signals being oscillation triggers from an exposure controller 110 installed in an exposure apparatus 100.

The controller 30 may set the charger 12 up as a specific charge voltage so that pulse energy of laser beams becomes the target pulse energy Et based on the received target pulse energy Et and the received trigger signals. The controller 30 may apply a voltage between the electrodes 11a and 11b by operating the switch 13a in the PPM 13 after a specific period of time elapses from each input of the trigger signals.

By applying the voltage, discharge may occur between the electrodes 11a and 11b, the laser gas may be excited, light emitted from the excited laser gas may resonate between the LNM 14 and the OC 15, and laser oscillation may be occurred. In this way, a laser beam narrowed by the prism 14a and the grating 14b may be outputted through the OC 15.

A laser beam having been passed through the OC 15 and partially reflected by the beam splitter 17a may enter the optical sensor 17c through the collector lens 17b. The optical sensor 17c may measure an energy value of the laser beam entering the optical sensor 17c. Pulse energy E of the laser beam being a corresponding value may be calculated by multiplying the energy value measured by the optical sensor 17c by a specific coefficient, for instance. The specific coefficient may be an inverse of a reflectance ratio of the beam splitter 17a. In the disclosure, the operation where the pulse energy E of a laser beam being a corresponding value is calculated based on the energy value of the laser beam measured by the optical sensor 17c may be described as an operation of the optical sensor 17c measuring the pulse energy E of a laser beam. A laser beam having been passed through the beam splitter 17a may enter the exposure apparatus 100.

The storage 31 installed in the controller 30 may store the pulse energy E.

The controller 30 may feedback-control the charge voltage based on a difference $\Delta E$ between the target energy Et and the pulse energy E.

By repeating the above-described steps, pulse energy E ($E_1$, $E_2$, . . . , $E_n$) of outputted laser beams, which are corresponding values, may be calculated based on energies measured by the optical sensor 17c, and these values may be stored in the storage 31.

The controller 30 may estimate a lifetime of each optical element based on the pulse energy E ($E_1$, $E_2$, . . . , $E_n$) of the outputted laser beams. For example, the controller 30 may estimate lifetimes of the windows 10a and 10b mounted on the laser chamber 10, the OC 15, the prism 14a or the grating 14b installed in the LNM 14, and the like.

Figure 2A:
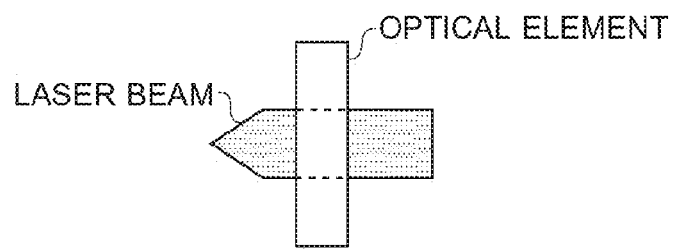
FIG. 2A is an illustration for explaining a relationship between an optical element and a laser beam entering the optical element in a plane parallel to a traveling direction of the laser beam.
Figure 2B:
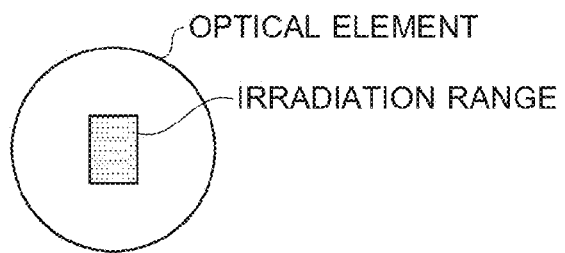
FIG. 2B is an illustration for explaining a relationship between an optical element and a laser beam entering the optical element in a plane perpendicular to the traveling direction of the laser beam.

2. Lifetime Estimation Method of Optical Element in Excimer Laser Apparatus 2.1 Estimation and Parameter of Lifetime of Optical Element As parameters related to a lifetime of an optical element, examples may include pulse energy P of a laser beam entering the optical element, an irradiation area So in a region irradiated with the laser beam entering the optical element, and the like. FIGS. 2A and 2B show a state in that an optical element is irradiated with a laser beam. FIG. 2A is an illustration in a plane parallel to a traveling direction of the laser beam, and FIG. 2B is an illustration in a plane perpendicular to the traveling direction of the laser beam.

By the way, in a region irradiated with a laser beam in an optical element, with consideration of single photon absorption and two-photon absorption, absorption energy A per unit area may be represented by the following formula (1). Here, the absorption energy A per unit area may include absorption energy in a thickness direction of the optical element. In the disclosure, "absorption energy per unit area in a region irradiated with a laser beam in an optical element" may also be described as "absorption energy per unit area".

$$A \approx a \cdot F + b \cdot F^2 \qquad (1)$$

In the formula (1), a may be a coefficient of single photon absorption, b may be a coefficient of two-photon absorption, and F may be an energy density per unit area (F=P/So).

When a fluence of each pulse laser beam is defined as $F_i$ (=$P_i$/So), an integration value Asum of the absorption energy per unit area may be represented by the following formula (2). Furthermore, when it is possible to ignore three-or-more-photon absorption, the integration value Asum of the absorption energy per unit area may be represented by the following approximate formula (3). Here, $P_i$ indicates pulse energy of each pulse laser beam.

$$\text{Asum} \approx \Sigma(a \cdot F_i + b \cdot F_i^2) \approx (a/So)\Sigma P_i + (b/So^2)\Sigma P_i^2 \qquad (2)$$

$$\text{Asum} = \Sigma(a \cdot F_i + b \cdot F_i^2) = (a/So)\Sigma P_i + (b/So^2)\Sigma P_i^2 \qquad (3)$$

Although the formulas (2) and (3) are formulas in a case where single photon absorption and two-photon absorption are dominative, when single photon absorption is dominative, the integration value Asum of absorption energy per unit area may be represented by the following formula (4). In such case, when two-or-more-photon absorption can be ignored, the integration value Asum of absorption energy per unit area may be represented by the following approximate formula (5). Furthermore, when two-photon absorption is dominative, the integration value Asum of absorption energy per unit area may be represented by the following formula (6). In such case, when single photon absorption and three-or-more-photon absorption can be ignored, the integration value Asum of absorption energy per unit area may be represented by the following approximate formula (7).

$$\text{Asum} \approx (a/So)\Sigma P_i \qquad (4)$$

$$\text{Asum} = (a/So)\Sigma P_i \qquad (5)$$

$$\text{Asum} \approx (b/So^2)\Sigma P_i^2 \qquad (6)$$

$$\text{Asum} = (b/So^2)\Sigma P_i^2 \qquad (7)$$

In this way, the integration value Asum of absorption energy per unit area may be calculated based on a sum of an integration value $\Sigma P_i$ of the irradiation pulse energy $P_i$ and an integration value $\Sigma P_i^2$ of a square of irradiation pulse energy $P_i$. Furthermore, the integration value Asum of absorption energy per unit area may be calculated based on the integration value $\Sigma P_i$ of the irradiation pulse energy $P_i$. Moreover, the integration value Asum of absorption energy per unit area may be calculated based on the integration value $\Sigma P_i^2$ of a square of irradiation pulse energy $P_i$.

Next, estimation of a lifetime of an optical element will be described. When an integration value of absorption energy per unit area not capable of maintaining performance of the laser apparatus is defined as a lifetime integration value Asumlife, by satisfying a relationship represented by the following formula (8), it is possible to estimate that an optical element reaches the end of its lifetime. As the performance of the laser apparatus, examples may include pulse energy of a laser beam outputted through the OC 15, a polarization of the laser beam outputted through the OC 15, a beam profile of the laser beam outputted through the OC 15, and the like, for instance.

$$\text{Asumlife} < \text{Asum} \qquad (8)$$

When the controller 30 estimates that the optical element reaches the end of its lifetime, the controller 30 may notify an external device that the optical element reaches the end of its lifetime, or display that on an operation panel, or the like, of the laser apparatus.

Furthermore, in order to detect that the optical element is close to the end of its lifetime, the controller 30 may estimate that the optical element is close to the end of its lifetime when a relationship represented by the following formula (9) is satisfied.

$$\beta \cdot \text{Asumline} < \text{Asum} \qquad (9)$$

When the controller 30 estimates that the optical element is close to the end of its lifetime, the controller 30 may notice an external device that the optical element is close to the end of its lifetime, or display that on an operation panel, or the like, of the laser apparatus. Here, $\beta$ may be a value within a range of $0.8 \leq \beta < 1$.

(Explanation of Integration Value at Optical Element)

Figure 3:
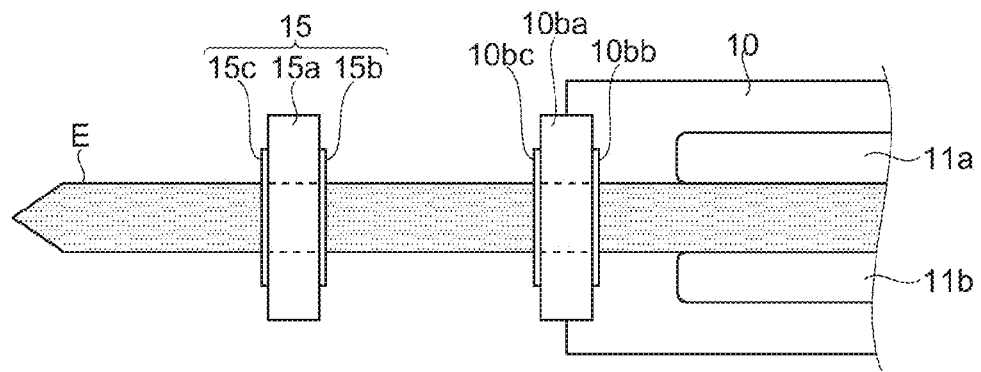
FIG. 3 is an illustration for explaining the optical element in the laser apparatus according to the disclosure.

Next, using FIG. 3, a case where the optical element is the OC 15 or the window 10b will be explained.

(Integration Value of Energy at OC 15)

Firstly, a case where the optical element is the OC 15 will be described. The OC 15 may have a partial reflection film 15b formed on one surface of a transparent substrate 15a, and an anti-reflection film 15c formed on the other surface of the transparent substrate 15a. The OC 15 may be arranged so that the one surface with the partial reflection film 15b faces to the laser chamber 10.

Using pulse energy E of a laser beam outputted from the OC 15, pulse energy Poc of the laser beam entering the partial reflection film 15b in the OC 15 may be calculated based on the following formula (10). In the formula (10), T is a transmissivity of the OC 15.

$$\text{Poc} = (1/T) \cdot E \qquad (10)$$

In the explanation, it is assumed that the most dominative factor in the lifetime of the OC 15 is the partial reflection film 15b. That is, a lifetime of the partial reflection film 15b is shorter than those of the anti-reflection film 15c and the transparent substrate 15a constructing the OC 15. Furthermore, it is assumed that absorption by the transparent substrate 15a and absorption and reflection by the anti-reflection film 15c can be ignored because these are sufficiently small compared to those of the partial reflection film 15b, respectively.

Pulse energy $P_i$ of each pulse laser beam entering the OC 15 may be calculated based on the following formula (11) using pulse energy $E_i$ of respective pulse laser beams outputted from the OC 15. In the formula (11), G is a proportional constant, and in the case of the OC 15, G is 1/T.

$$P_i = G \cdot E_i = E_i / T \qquad (11)$$

With respect to the anti-reflection film 15b, an integration value Asum of absorption energy per unit area may be represented by the following formula (12) which can be obtained by plugging the formula (11) in the formula (3).

$$\text{Asum} = (a \cdot G/So) \Sigma E_i + (b \cdot G^2/So^2) \Sigma E_i^2 \qquad (12)$$

The formula (12) is a formula in a case where both of single photon absorption and two-photon absorption are dominative. On the other hand, when single photon absorption is dominative, the integration value Asum of absorption energy per unit area may be represented by the following formula (13) which can be obtained by plugging the formula (11) in the formula (5). When two-photon absorption is dominative, the integration value Asum of absorption energy per unit area may be represented by the following formula (14) which can be obtained by plugging the formula (11) in the formula (7).

$$\text{Asum} = (a \cdot G/So) \Sigma E_i \qquad (13)$$

$$\text{Asum} = (b \cdot G^2 So^2) \Sigma E_i^2 \qquad (14)$$

As described above, from each of the pulse energies E1 to En of the pulse laser beams outputted from the OC 15, the integration value Asum of absorption energy per unit area for the anti-reflection film 15b of the OC 15 can be calculated.

(Integration Value of Energy at Window 10b)

Next, a case where the optical element is the window 10b will be described. The window 10b may have anti-reflection films 10bb and 10bc formed on respective surfaces of a transparent substrate 10ba.

Using pulse energy E of a laser beam outputted from the OC 15, pulse energy Pw of a laser beam entering the window 10b may be calculated based on the following formula (15). Specifically, the pulse energy Pw of the laser beam entering the window 10b may be a sum of pulse energy Poc of the laser beam entering the partial reflection film 15b of the OC 15 and energy R·Poc of a laser beam reflected by the OC 15. In the formula (15), T is a transmissivity of the OC 15, and R is a reflection ratio of the partial reflection film 15b of the OC 15. Furthermore, it is assumed that optical absorption at the transparent substrate 10ba of the window 10b is extremely small, and optical absorption and reflection at the anti-reflection films 10bb and 10bc are extremely small. The formula (15) is an approximate formula.

$$Pw = Poc + R \cdot Poc = (1+R) \cdot Poc = \{(1+R)T\} \cdot E \qquad (15).$$

Accordingly, pulse energy $P_i$ of each pulse laser beam entering the window 10b may be calculated based on the following formula (16) using the pulse energy $E_i$ of the respective pulse laser beams outputted from the OC 15. In the formula (16), G is a proportional constant, and in the case of the window 10b, G is $(1+R)/T$.

$$P_i = G \cdot E_i = \{(1+R)/T\} \cdot E_i \qquad (16)$$

Regarding the window 10b, by plugging G=(1+R)/T in the formulas (12), (13) and (14), the integration value Asum of energy per unit area absorbed by the window 10b can be obtained from the pulse energy $E_i$.

In the above, although the case where the optical element is the OC 15 or the window 10b is described, the disclosure can be applied to other optical elements in the laser apparatus. For example, the disclosure may also be applied to the prism 14a, the grating 14b in the LNM 14, the beam splitter 17a in the energy monitor unit 17, or the like.

Furthermore, it is also possible to calculate the proportional constant G based on positions of optical elements, and calculate the integration values Asum of absorption energy per unit area at these optical elements using the formulas (12), (13) and (14).

2.2 First Lifetime Estimation Method of Optical Element

Figure 4:
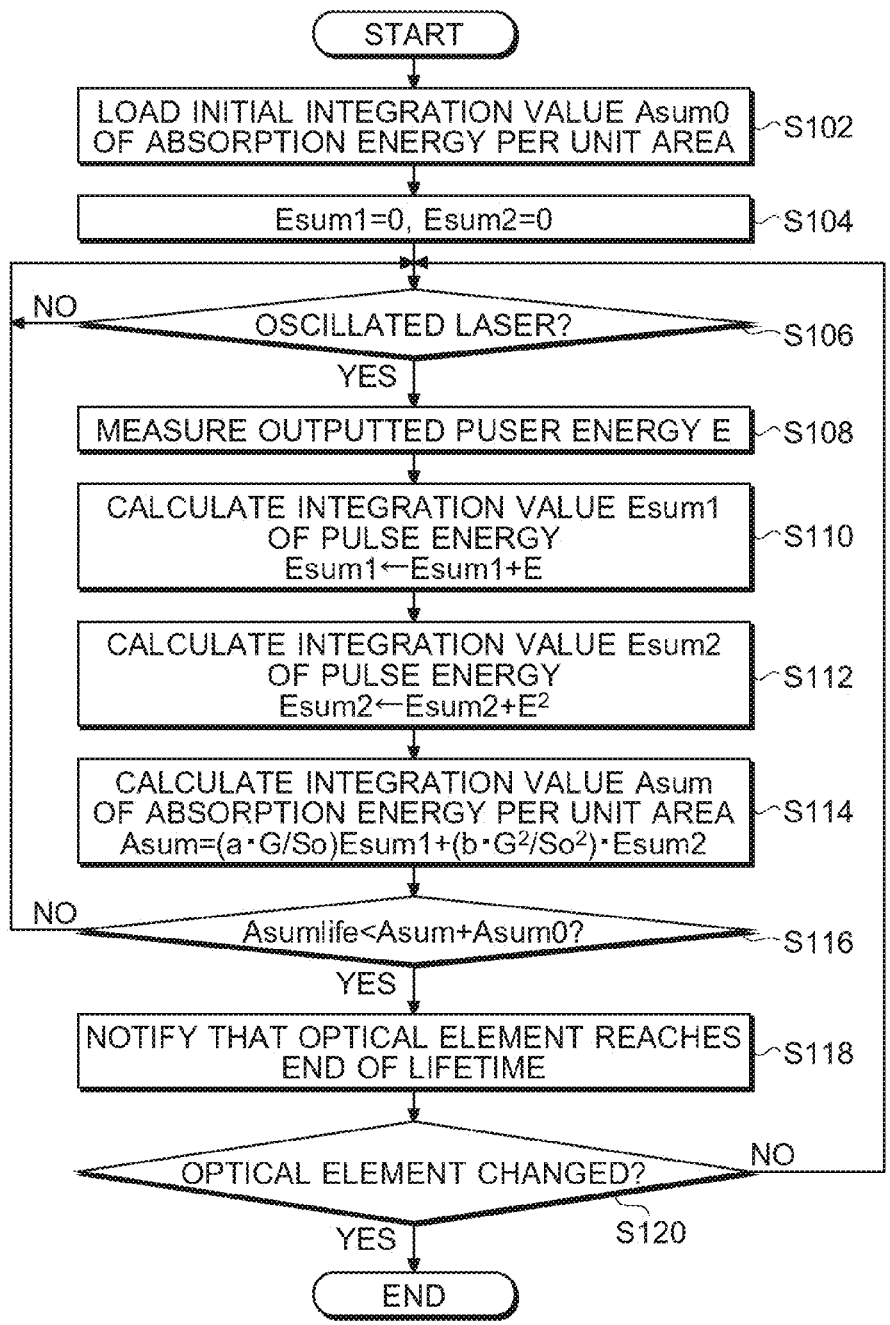
FIG. 4 is a flowchart for explaining a first control method of the laser apparatus according to the disclosure.

Using FIG. 4, a control method of the laser apparatus, specifically, a lifetime estimation method of an optical element in the laser apparatus, will be explained.

Firstly, in step S102, the controller 30 may load an initial integration value of absorption energy per unit area at an optical element being a target of the lifetime estimation, and define the loaded initial integration value of absorption energy per unit area as Asum0. When the optical element has been used in other laser apparatuses, for instance, the loaded initial integration value of absorption energy per unit area may be an integration value of absorption energy per unit to date at the optical element. When the optical element is new, the initial integration value of absorption energy per unit area Asum0 which is set at the start may be set as 0 (Asum0=0). In the case shown in FIG. 4, the loaded initial integration value of absorption energy per unit area may be a value calculated from a sum of values caused by single photon absorption and two-photon absorption.

Then, in step S104, the controller 30 may set integration values of pulse energy Esum1 and Esum2 as 0, respectively (Esum1=0, Esum2=0).

Then, in step S106, the controller 30 may apply a voltage between the electrodes 11a and 11b in the laser chamber 10, and determine whether laser oscillation occurs or not. When the controller 30 determines that the laser oscillation occurs, the controller 30 may progress to step S108. On the other hand, when the controller 30 determines that the laser oscillation does not occur, the controller 30 may execute step S106 again. The determination whether the laser oscillation occurs may be executed based on whether a trigger signal is transmitted to the switch 13a, or whether the energy monitor unit 17 detects a laser beam, for instance.

Then, in step S108, the controller 30 may measure energy of a laser beam separated by the beam splitter 17a using the optical sensor 17c, and calculate pulse energy E being a corresponding value from the measured energy. The value of energy of the laser beam measured by the optical sensor 17c may be transmitted to the controller 30 from the optical sensor 17c.

Then, in step S110, the controller 30 may calculate a new integration value Esum1 of pulse energy by adding the pulse energy E of the laser beam calculated in step S108 to the current integration value Esum1 of pulse energy.

In step S112, the controller 30 may calculate a new integration value Esum2 of pulse energy by adding a square of the pulse energy E of the laser beam calculated in step S108 to the current integration value Esum2 of pulse energy.

Then, in step S114, the controller 30 may calculate a new integration value Asum of absorption energy per unit area from the new integration values Esum1 and Esum2 of pulse energy using the formula (12).

Then, in step S116, the controller 30 may determine whether a sum of the integration value Asum of absorption energy per unit area and the initial integration value Asum0 exceeds the lifetime integration value Asumlife of the optical element or not. When the controller 30 determines that the Asum+Asum0 exceeds the Asumlife, the controller 30 may progress to step S118. On the other hand, when the controller 30 determines that the Asum+Asum0 does not exceed the Asumlife, the controller 30 may return to step S106.

Then, in step S118, the controller 30 may notify an external device that the optical element reaches the end of its lifetime. Instead of the notification to the external device, the controller 30 may display that on an operational panel, or the like, of the laser apparatus.

Then, in step S120, the controller 30 may determine whether the optical element is replaced or not. When the controller 30 determines that the optical element is replaced, the controller 30 may finish the operation of the lifetime estimation method of the optical element. On the other hand, when the controller 30 determines that the optical element is not replaced, the controller 30 may return to step S106.

Although the above-description is a case where a lifetime of each optical element is estimated, the estimation method can also be applied to an optical unit, optical module, or the like, which includes a plurality of optical elements. In such case, a lifetime of an optical unit, optical module, or the like, may be estimated on the basis of an optical element with a shortest lifetime thereamong. This is the same with other estimation methods which will be described later on.

2.3 Second Lifetime Estimation Method of Optical Element

Figure 5:
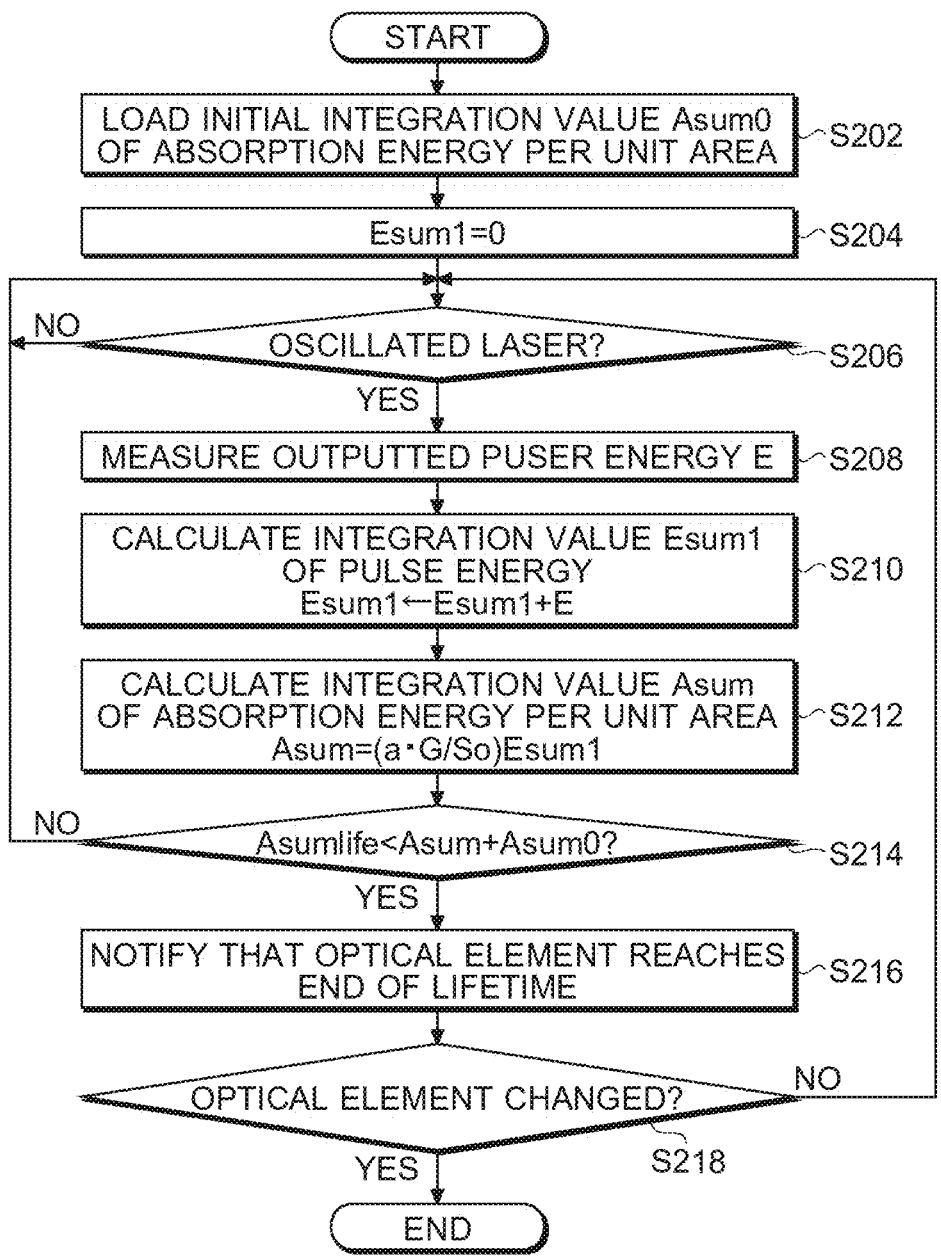
FIG. 5 is a flowchart for explaining a second control method of the laser apparatus according to the disclosure.

Using FIG. 5, another control method of the laser apparatus, specifically, another lifetime estimation method of an optical element in the laser apparatus, will be explained.

Firstly, in step S202, the controller 30 may load an initial integration value of absorption energy per unit area at an optical element being a target of the lifetime estimation, and define the loaded initial integration value of absorption energy per unit area as Asum0. When the optical element has been used in other laser apparatuses, for instance, the loaded initial integration value of absorption energy per unit area may be an integration value of absorption energy per unit to date at the optical element. When the optical element is new, the initial integration value of absorption energy per unit area Asum0 which is set at the start may be defined as 0 (Asum0=0). In the case shown in FIG. 5, the loaded initial integration value of absorption energy per unit area may be a value calculated from a value caused by single photon absorption.

Then, in step S204, the controller 30 may set an integration value of pulse energy Esum1 as 0 (Esum1=0).

Then, in step S206, the controller 30 may apply a voltage between the electrodes 11a and 11b in the laser chamber 10, and determine whether laser oscillation occurs or not. When the controller 30 determines that the laser oscillation occurs, the controller 30 may progress to step S208. On the other hand, when the controller 30 determines that the laser oscillation does not occur, the controller 30 may execute step S206 again. The determination whether the laser oscillation occurs may be executed based on whether a trigger signal is transmitted to the switch 13a, or whether the energy monitor unit 17 detects a laser beam, for instance.

Then, in step S208, the controller 30 may measure energy of a laser beam separated by the beam splitter 17a using the optical sensor 17c, and calculate pulse energy E being a corresponding value from the measured energy. The value of energy of the laser beam measured by the optical sensor 17c may be transmitted to the controller 30 from the optical sensor 17c.

Then, in step S210, the controller 30 may calculate a new integration value Esum1 of pulse energy by adding the pulse energy E of the laser beam calculated in step S208 to the current integration value Esum1 of pulse energy.

Then, in step S212, the controller 30 may calculate a new integration value Asum of absorption energy per unit area from the new integration value Esum1 of pulse energy using the formula (13).

Then, in step S214, the controller 30 may determine whether a sum of the integration value Asum of absorption energy per unit area and the initial integration value Asum0 exceeds the lifetime integration value Asumlife of the optical element or not. When the controller 30 determines that the Asum+Asum0 exceeds the Asumlife, the controller 30 may progress to step S216. On the other hand, when the controller 30 determines that the Asum+Asum0 does not exceed the Asumlife, the controller 30 may return to step S206.

Then, in step S216, the controller 30 may notify an external device that the optical element reaches the end of its lifetime. Instead of the notification to the external device, the controller 30 may display that on an operational panel, or the like, of the laser apparatus.

Then, in step S218, the controller 30 may determine whether the optical element is replaced or not. When the controller 30 determines that the optical element is replaced, the controller 30 may finish the operation of the lifetime estimation method of the optical element. On the other hand, when the controller 30 determines that the optical element is not replaced, the controller 30 may return to step S206.

2.4 Third Lifetime Estimation Method of Optical Element

Figure 6:
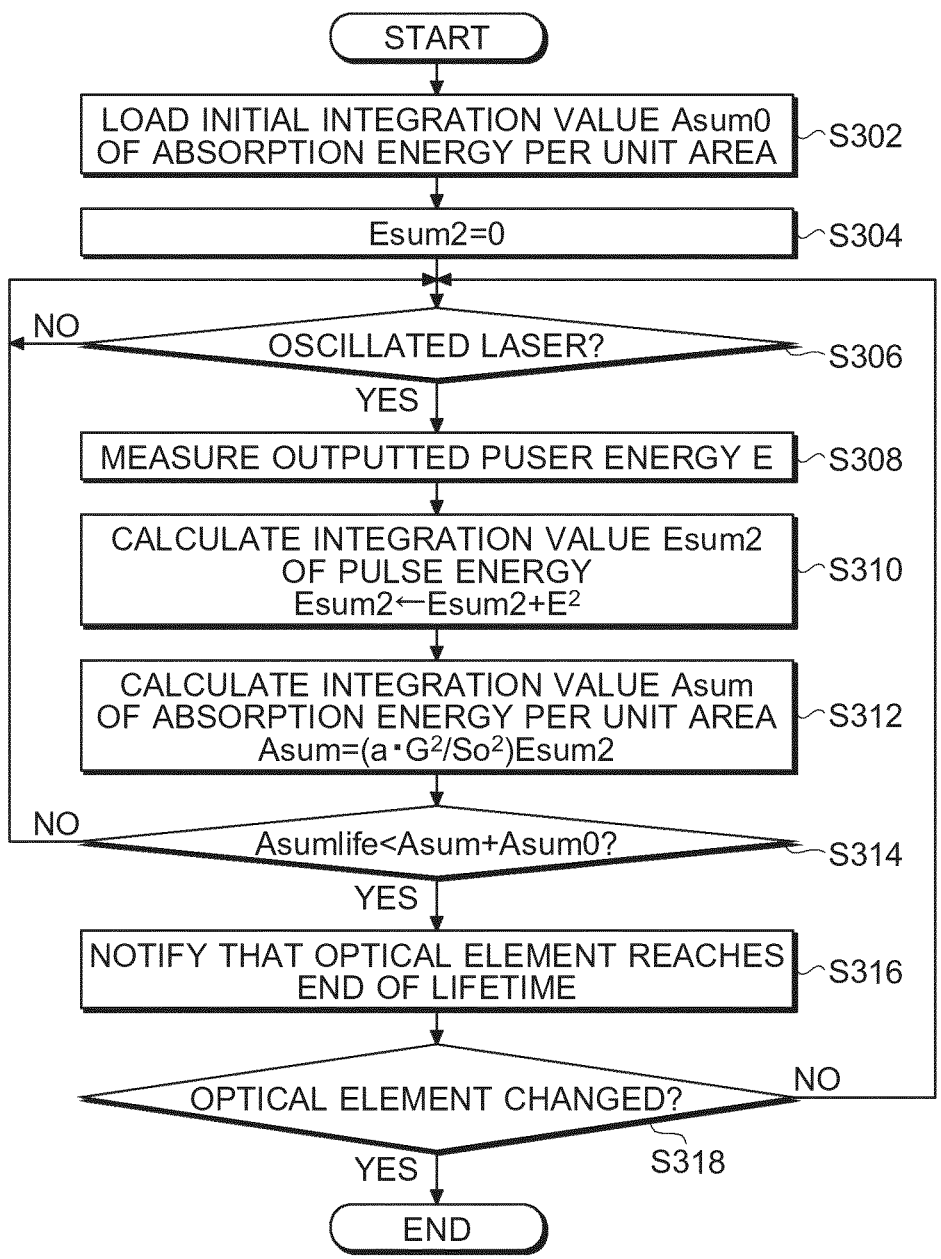
FIG. 6 is a flowchart for explaining a third control method of the laser apparatus according to the disclosure.

Using FIG. 6, yet another control method of the laser apparatus, specifically, yet another lifetime estimation method of an optical element in the laser apparatus, will be explained.

Firstly, in step S302, the controller 30 may load an initial integration value of absorption energy per unit area at an optical element being a target of the lifetime estimation, and define the loaded initial integration value of absorption energy per unit area as Asum0. When the optical element has been used in other laser apparatuses, for instance, the loaded initial integration value of absorption energy per unit area may be an integration value of absorption energy per unit to date at the optical element. When the optical element is new, the initial integration value of absorption energy per unit area Asum0 which is set at the start may be defined as 0 (Asum0=0). In the case shown in FIG. 6, the loaded initial integration value of absorption energy per unit area may be a value calculated from a value caused by single photon absorption.

Then, in step S304, the controller 30 may set an integration value of pulse energy Esum2 as 0 (Esum2=0).

Then, in step S306, the controller 30 may apply a voltage between the electrodes 11a and 11b in the laser chamber 10, and determine whether laser oscillation occurs or not. When the controller 30 determines that the laser oscillation occurs, the controller 30 may progress to step S308. On the other hand, when the controller 30 determines that the laser oscillation does not occur, the controller 30 may execute step S306 again. The determination whether the laser oscillation occurs may be executed based on whether a trigger signal is transmitted to the switch 13a, or whether the energy monitor unit 17 detects a laser beam, for instance.

Then, in step S308, the controller 30 may measure energy of a laser beam separated by the beam splitter 17a using the optical sensor 17c, and calculate pulse energy E being a corresponding value from the measured energy. The value of energy of the laser beam measured by the optical sensor 17c may be transmitted to the controller 30 from the optical sensor 17c.

Then, in step S310, the controller 30 may calculate a new integration value Esum2 of pulse energy by adding a square of the pulse energy E of the laser beam calculated in step S308 to the current integration value Esum2 of pulse energy.

Then, in step S312, the controller 30 may calculate a new integration value Asum of absorption energy per unit area from the new integration value Esum2 of pulse energy using the formula (14).

Then, in step S314, the controller 30 may determine whether a sum of the integration value Asum of absorption energy per unit area and the initial integration value Asum0 exceeds the lifetime integration value Asumlife of the optical element or not. When the controller 30 determines that the Asum+Asum0 exceeds the Asumlife, the controller 30 may progress to step S316. On the other hand, when the controller 30 determines that the Asum+Asum0 does not exceed the Asumlife, the controller 30 may return to step S306.

Then, in step S316, the controller 30 may notify an external device that the optical element reaches the end of its lifetime. Instead of the notification to the external device, the controller 30 may display that on an operational panel, or the like, of the laser apparatus.

Then, in step 318, the controller 30 may determine whether the optical element is replaced or not. When the controller 30 determines that the optical element is replaced, the controller 30 may finish the operation of the lifetime estimation method of the optical element. On the other hand, when the controller 30 determines that the optical element is not replaced, the controller 30 may return to step S306.

2.5 Estimation Method Based on Relational Expression Between Pulse Energy and Lifetime of Optical Element (Fourth Lifetime Estimation Method of Optical Element)

Next, using FIG. 7, another lifetime estimation method of an optical element will be explained. A lifetime of an optical element may be estimated based on a relationship between the pulse energy E and a lifetime shot number Blife shown in FIG. 7. The lifetime shot number Blife is a shot number where an optical element reaches the end of its lifetime when the optical element is irradiated with the shot number of the laser beams with the pulse energy E.

Figure 7:
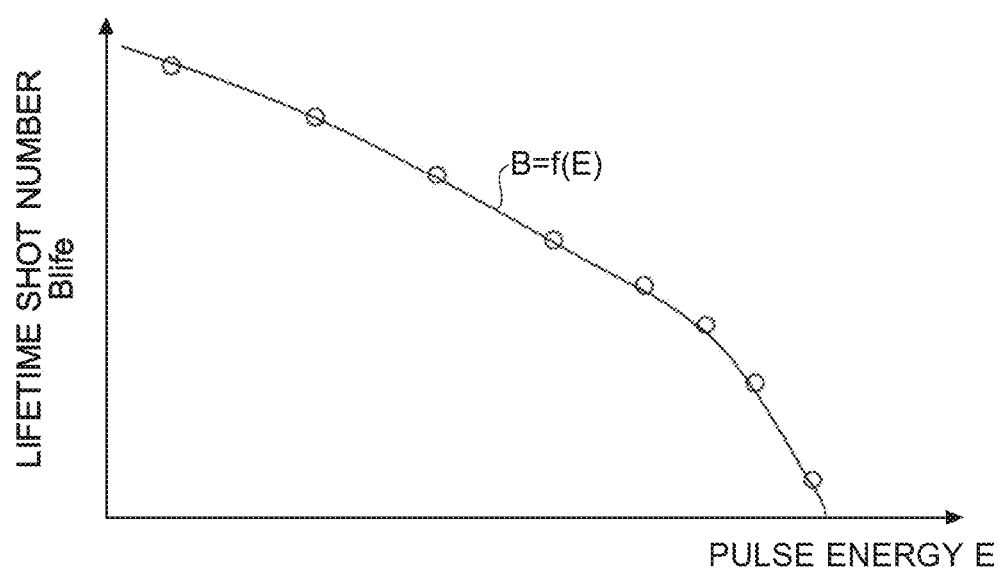
FIG. 7 is a correlation diagram between input energy Ein and a lifetime shot number Blife.

As shown in FIG. 7, the relationship between the pulse energy E and the lifetime shot number Blife may be previously measured by a proof, or the like. An approximate function of the lifetime shot number obtained as the relationship Blife=f(E) may be stored in the storage 31 of the controller 30. A lifetime when the pulse energy E is changed may be estimated using the approximate function of the lifetime shot number Blife=f(E).

The controller 30 may calculate a lifetime index value L by integrating inverses of the respective lifetime shot numbers Blife at the pulse energy E using the following formula (17), and when the L is equal to or greater than 1 (L>1), the controller 30 may estimate that the optical element reaches the end of its lifetime.

$$L=\Sigma 1/f(E_i) \qquad (17)$$

When the lifetime index value L is equal to or greater than 1 (L≥1), the controller 30, or the like, may notify an external device that the optical element reaches the end of its lifetime, or display that on an operation panel, or the like, of the laser apparatus.

Furthermore, when the lifetime index value L is greater than γ, the controller 30, or the like, may notify an external device that the optical element is close to the end of its lifetime, or display that on an operation panel, or the like, of the laser apparatus. Here, γ may be equal to or greater than 0.8 and smaller than 1 (0.8≤γ<1).

Figure 8:
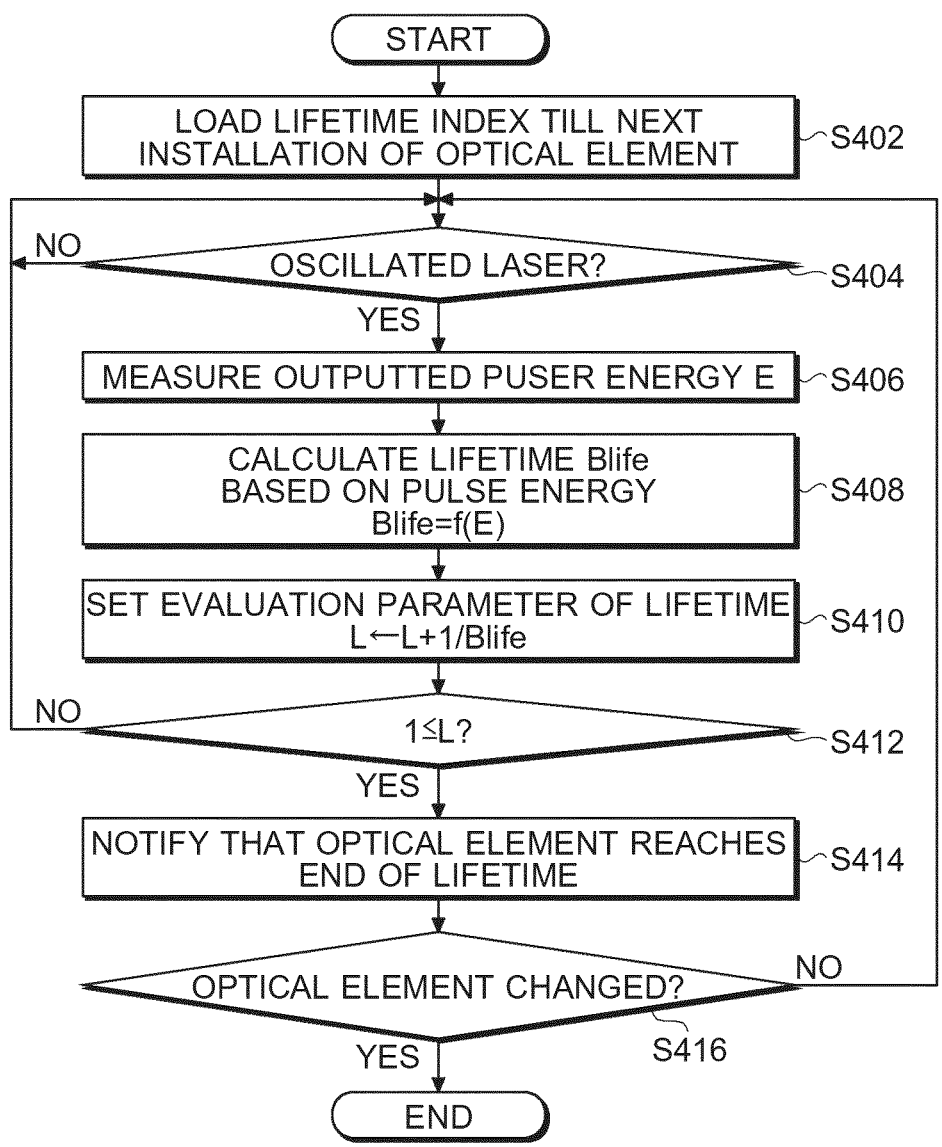
FIG. 8 is a flowchart for explaining a fourth control method of the laser apparatus (an estimation method based on a relational expression between pulse energy and a lifetime of the optical element) according to the disclosure.

Using FIG. 8, the lifetime estimation method of an optical element will be explained in detail.

Firstly, in step S402, the controller 30 may load a current lifetime index value of an optical element being a target of the lifetime estimation, and define the loaded lifetime index value as the lifetime index value L. The loaded lifetime index value may be a lifetime index value in a case where the optical element has been used in other laser apparatuses, for instance. When the optical element is new, the lifetime index value L may be set as 0 (L=0).

Then, in step S404, the controller 30 may apply a voltage between the electrodes 11a and 11b in the laser chamber 10, and determine whether laser oscillation occurs or not. When the controller 30 determines that the laser oscillation occurs, the controller 30 may progress to step S406. On the other hand, when the controller 30 determines that the laser oscillation does not occur, the controller 30 may execute step S404 again. The determination whether the laser oscillation occurs may be executed based on whether a trigger signal is transmitted to the switch 13a, or whether the energy monitor unit 17 detects a laser beam, for instance.

Then, in step S406, the controller 30 may measure energy of a laser beam separated by the beam splitter 17a using the optical sensor 17c, and calculate pulse energy E being a corresponding value from the measured energy. The value of energy of the laser beam measured by the optical sensor 17c may be transmitted to the controller 30 from the optical sensor 17c.

Then, in step S408, the controller 30 may calculate the lifetime shot number Blife based on the pulse energy E measured in step S406 using the approximate formula Blife=f(E).

Then, in step S410, the controller 30 may calculate a new lifetime index value L by adding an inverse of the lifetime shot number Blife calculated in step S408 to the current lifetime index value L.

Then, in step S412, the controller 30 may determine whether the lifetime index value L is equal to or greater than 1 or not. When the controller 30 determines that the lifetime index value L is equal to or greater than 1, the controller 30 may progress to step S414. On the other hand, when the controller 30 determines that the lifetime index value L is not equal to or greater than 1, the controller 30 may return to step S404.

Then, in step S414, the controller 30 may notify an external device that the optical element reaches the end of its lifetime. Instead of the notification to the external device, the controller 30 may display that on an operational panel, or the like, of the laser apparatus.

Then, in step S416, the controller 30 may determine whether the optical element is replaced or not. When the controller 30 determines that the optical element is replaced, the controller 30 may finish the operation of the lifetime estimation method of the optical element. On the other hand, when the controller 30 determines that the optical element is not replaced, the controller 30 may return to step S404.

2.6 Fifth Lifetime Estimation Method of Optical Element

Next, yet another lifetime estimation method of an optical element will be explained.

When a lifetime of an optical element is estimated, pulse energy E of pulse laser beams may be monitored, and based on a lifetime shot number Blife of the optical element corresponding to the pulse energy E, a lifetime index value L may be approximated.

For example, as shown in FIG. 9, when the pulse energy E of pulse laser beams is smaller than 10 mJ, the lifetime shot number Blife may be set as a value Ba. When the pulse energy E of pulse laser beams is equal to or greater than 10 mJ and smaller than 11.25 mJ, the lifetime shot number Blife may be set as a value Bb. When the pulse energy E of pulse laser beams is equal to or greater than 11.25 mJ and smaller than 13.75 mJ, the lifetime shot number Blife may be set as a value Bc. When the pulse energy E of pulse laser beams is equal to or greater than 13.75 mJ and smaller than 15 mJ, the lifetime shot number Blife may be set as a value Bd. When the pulse energy E of pulse laser beams is equal to or greater than 15 mJ, the lifetime shot number Blife may be set as a value Be.

From the shot number Blife obtained in such a manner, the lifetime index value L may be approximated based on the following formula (18).

$$L \approx na/Ba + nb/Bb + nc/Bc + nd/Bd + ne/Be \quad (18)$$

Here, the na indicates a shot number of pulse laser beams of which pulse energy E is smaller than 10 mJ. The nb indicates a shot number of pulse laser beams of which pulse energy E is equal to or greater than 10 mJ and smaller than 11.25 mJ. The nc indicates a shot number of pulse laser beams of which pulse energy E is equal to or greater than 11.25 mJ and smaller than 13.75 mJ. The nd indicates a shot number of pulse laser beams of which pulse energy E is equal to or greater than 13.75 mJ and smaller than 15 mJ. The ne indicates a shot number of pulse laser beams of which pulse energy E is equal to or greater than 15 mJ.

Next, the lifetime estimation method of an optical element will be explained in detail using FIG. 10.

Firstly, in step S432, the controller 30 may load a current lifetime index value of an optical element being a target of the lifetime estimation, and define the loaded lifetime index value as the lifetime index value L. The loaded lifetime index value may be a lifetime index value in a case where the optical element has been used in other laser apparatuses, for instance. When the optical element is new, the lifetime index value L may be set as 0 (L=0).

Then, in step S434, the controller 30 may apply a voltage between the electrodes 11a and 11b in the laser chamber 10, and determine whether laser oscillation occurs or not. When the controller 30 determines that the laser oscillation occurs, the controller 30 may progress to step S436. On the other hand, when the controller 30 determines that the laser oscillation does not occur, the controller 30 may execute step S434 again. The determination whether the laser oscillation occurs may be executed based on whether a trigger signal is transmitted to the switch 13a, or whether the energy monitor unit 17 detects a laser beam, for instance.

Then, in step S436, the controller 30 may measure energy of a laser beam separated by the beam splitter 17a using the optical sensor 17c, and calculate pulse energy E being a corresponding value from the measured energy. The value of energy of the laser beam measured by the optical sensor 17c may be transmitted to the controller 30 from the optical sensor 17c.

Then, in step S438, the controller 30 may execute a sub-routine for identifying a range of pulse energy which will be explained later on. Thereby, from the pulse energy E of the pulse laser beams measured in step S436, a corresponding lifetime shot number Blife may be obtained.

Then, in step S440, the controller 30 may calculate a new lifetime index value L by adding an inverse of the lifetime shot number Blife calculated in step S436 to the current lifetime index value L.

Then, in step S442, the controller 30 may determine whether the lifetime index value L is equal to or greater than 1 or not. When the controller 30 determines that the lifetime index value L is equal to or greater than 1, the controller 30 may progress to step S444. On the other hand, when the controller 30 determines that the lifetime index value L is not equal to or greater than 1, the controller 30 may return to step S434.

Then, in step S444, the controller 30 may notify an external device that the optical element reaches the end of its lifetime. Instead of the notification to the external device, the controller 30 may display that on an operational panel, or the like, of the laser apparatus.

Then, in step S446, the controller 30 may determine whether the optical element is replaced or not. When the controller 30 determines that the optical element is replaced, the controller 30 may finish the operation of the lifetime estimation method of the optical element. On the other hand, when the controller 30 determines that the optical element is not replaced, the controller 30 may return to step S434.

Next, using FIG. 11, the sub-routine for identifying the range of the pulse energy in step S438 of FIG. 10 will be explained. The sub-routine may be executed on the controller 30, and it may be a sub-routine for obtaining the corresponding lifetime shot number Blife from the pulse energy E of the pulse laser beams measured in step S436.

Firstly, in step S452, the controller 30 may determine whether the measured pulse energy E of pulse laser beams is smaller than 10 mJ or not. When the measured pulse energy E of pulse laser beams is smaller than 10 mJ, the controller 30 may progress to step S454. When the measured pulse energy E of pulse laser beams is not smaller than 10 mJ, the controller 30 may progress to step S456.

Figure 10:
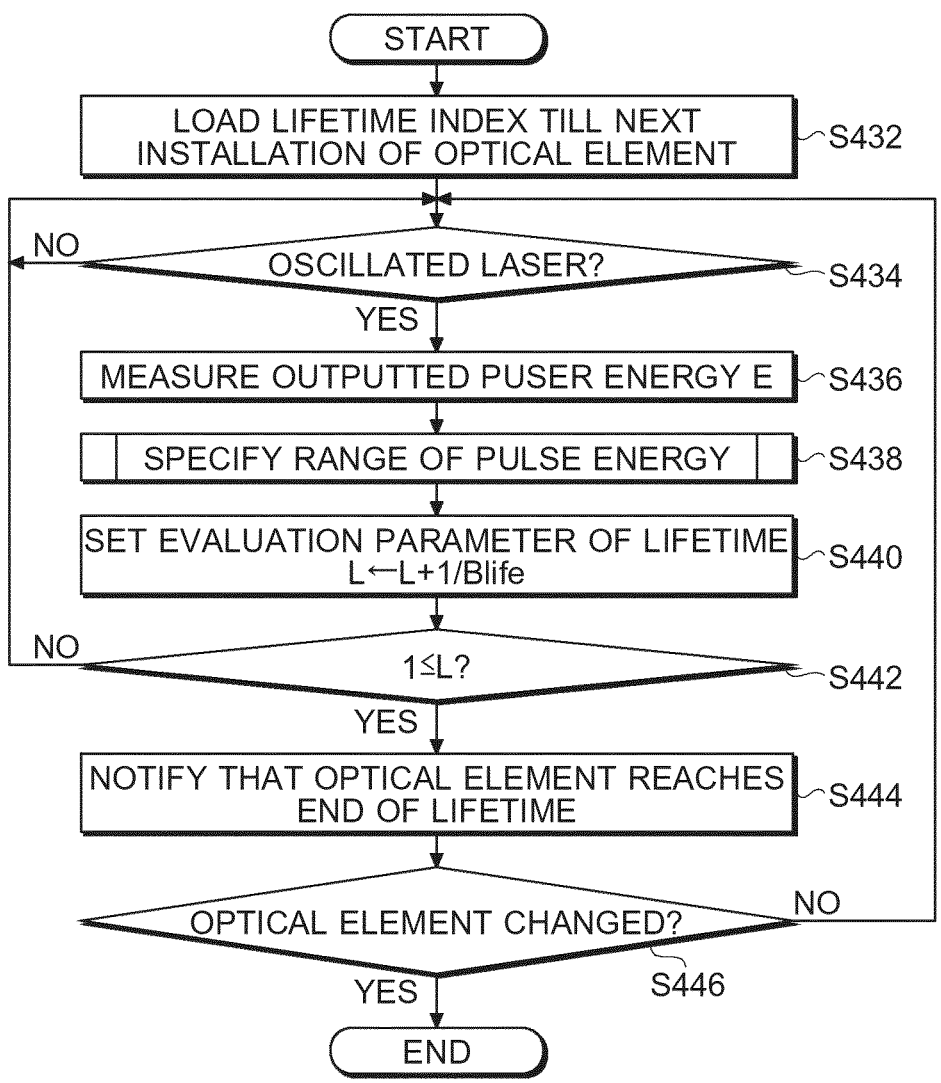
FIG. 10 is a flowchart for explaining the fifth control method of the laser apparatus according to the disclosure.
Figure 11:
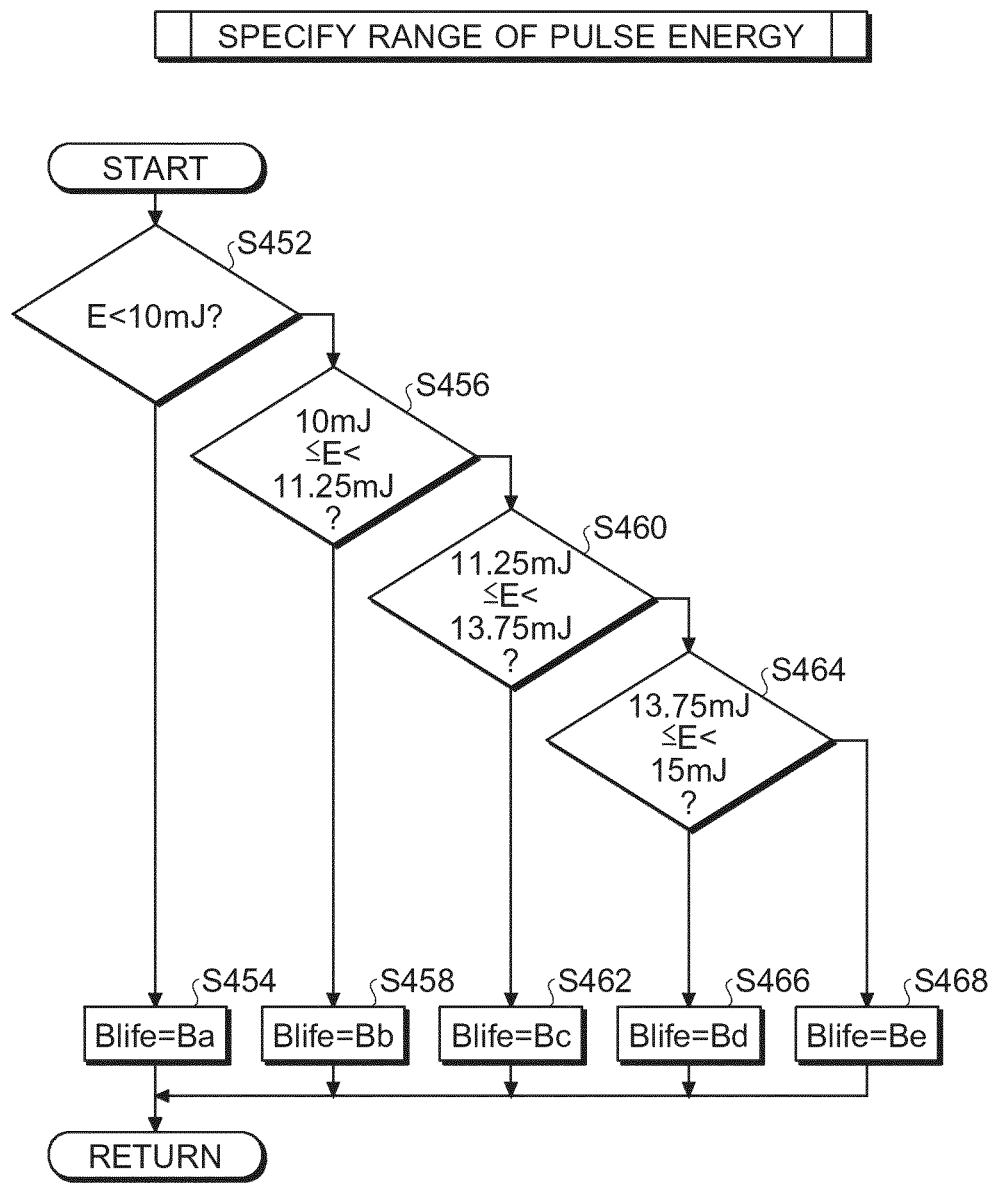
FIG. 11 is a flowchart showing a sub-routine in the fifth control method of the laser apparatus according to the disclosure.

In step S454, the controller 30 may set the lifetime shot number Blife as Ba, and then, return to the main routine shown in FIG. 10.

In step S456, the controller 30 may determine whether the measured pulse energy E of pulse laser beams is within a range equal to or greater than 10 mJ and smaller than 11.25 mJ or not. When the measured pulse energy E of pulse laser beams is within the range equal to or greater than 10 mJ and smaller than 11.25 mJ, the controller 30 may progress to step S458. When the measured pulse energy E of pulse laser beams is not within the range equal to or greater than 10 mJ and smaller than 11.25 mJ, the controller 30 may progress to step S460.

In step S458, the controller 30 may set the lifetime shot number Blife as Bb, and then, return to the main routine shown in FIG. 10.

In step S460, the controller 30 may determine whether the measured pulse energy E of pulse laser beams is within a range equal to or greater than 11.25 mJ and smaller than 13.75 mJ or not. When the measured pulse energy E of pulse laser beams is within the range equal to or greater than 11.25 mJ and smaller than 13.75 mJ, the controller 30 may progress to step S462. When the measured pulse energy E of pulse laser beams is not within the range equal to or greater than 11.25 mJ and smaller than 13.75 mJ, the controller 30 may progress to step S464.

In step S462, the controller 30 may set the lifetime shot number Blife as Bc, and then, return to the main routine shown in FIG. 10.

In step S464, the controller 30 may determine whether the measured pulse energy E of pulse laser beams is within a range equal to or greater than 13.75 mJ and smaller than 15 mJ or not. When the measured pulse energy E of pulse laser beams is within the range equal to or greater than 13.75 mJ and smaller than 15 mJ, the controller 30 may progress to step S466. When the measured pulse energy E of pulse laser beams is not within the range equal to or greater than 13.75 mJ and smaller than 15 mJ, the controller 30 may progress to step S468.

In step S466, the controller 30 may set the lifetime shot number Blife as Bd, and then, return to the main routine shown in FIG. 10.

In step S468, the controller 30 may set the lifetime shot number Blife as Be, and then, return to the main routine shown in FIG. 10.

Figure 12:
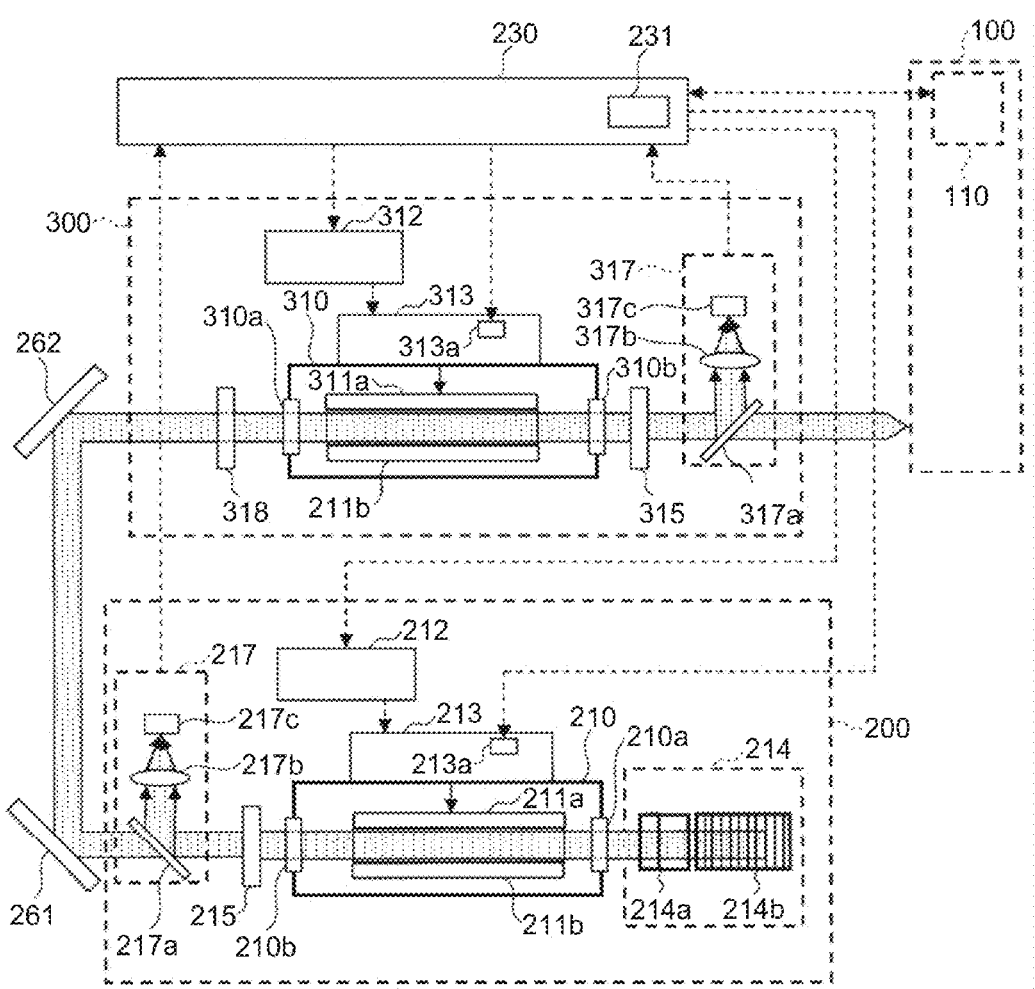
FIG. 12 is a diagram showing a structure of a double chamber laser apparatus according to the disclosure.

3. Lifetime Estimation Method of Optical Element in Double Chamber System 3.1 Structure In the following, a double chamber excimer laser apparatus will be described. As shown in FIG. 12, a double chamber excimer laser apparatus may include a master oscillator (MO) 200, a power oscillator (PO) 300, a controller 230, and high reflection mirrors 261 and 262. The controller 230 may include a storage 231.

The MO 200 may have the same structure as the laser apparatus shown in FIG. 1. Particularly, the MO 200 may include an MO laser chamber 210, an MO charger 212, an MO pulse power module (PPM) 213, a laser resonator, and an MO energy monitor unit 217.

The MO laser chamber 210 may include a pair of electrodes 211a and 211b, and two windows 210a and 210b capable of transmitting laser beams. The MO laser chamber 210 can include a laser gas being a laser gain medium.

The laser resonator may include a line narrowing module (LNM) 214 and an MO output coupler (OC) 215. The MO laser chamber 210 may disposed on a light path of the laser resonator.

The LNM 214 may include a prism 214a and a grating 214b. The prism 214a may expand a width of a laser beam. The grating 214b may be arranged in Littrow so that the laser apparatus oscillates at a target wavelength.

The MO OC 215 may be a partial reflection mirror capable of reflecting a part of a laser beam and transmitting a part of the laser beam.

The MO energy monitor unit 217 may include a beam splitter 217a disposed on a light path of a laser beam having been passed through the MO OC 215, a collector lens 217b and an optical sensor 217c.

The MO PPM 213 may include a capacitor and a switch 213a, and be connected to the electrodes 211a and 211b. By applying a trigger signal from the controller 230 to the switch 213a, discharge may occur between the electrodes 211a and 211b. The MO charger 212 may be connected to the capacitor in the MO PPM 213.

The PO 300 may include a PO laser chamber 310, a PO charger 312, a PO pulse power module (PPM) 313, a laser resonator, and a PO energy monitor unit 317.

The PO laser chamber 310 may include a pair of electrodes 311a and 311b, and two windows 310a and 310b capable of transmitting laser beams. The PO laser chamber 310 may include a laser gas being a laser gain medium.

The laser resonator may include a line narrowing module (LNM) 318 and a PO output coupler (OC) 315. The PO laser chamber 310 may disposed on a light path of the laser resonator.

The PO OC 315 may be a partial reflection mirror capable of reflecting a part of a laser beam and transmitting a part of the laser beam.

The PO energy monitor unit 317 may include a beam splitter 317a disposed on a light path of a laser beam having been passed through the PO OC 315, a collector lens 317b and an optical sensor 317c.

The PO PPM 313 may include a capacitor and a switch 313a, and be connected to the electrodes 311a and 311b. By applying a trigger signal from the controller 230 to the switch 313a, discharge may occur between the electrodes 311a and 311b. The PO charger 312 may be connected to the capacitor in the PO PPM 313.

3.2 Operation

The controller 230 may receive a target pulse energy Et and trigger signals being oscillation triggers from an exposure controller 110 installed in an exposure apparatus 100.

The controller 230 may set the chargers up as specific charge voltages (Vhvmo, Vhvpo) so that pulse energy of laser beams outputted from the PO 300 becomes the target pulse energy Et based on the received target pulse energy Et and the received trigger signals. Particularly, the controller 230 may set the MO charger 212 up as the specific charge voltage (Vhvmo), and set the PO charger 312 up as the specific charge voltage (Vhvpo). The controller 230 may apply a voltage between the electrodes 211a and 211b by operating the switch 213a in the MO PPM 213 after a specific period of time elapses from each input of the trigger signals. Furthermore, the controller 230 may apply a voltage between the electrodes 311a and 311b by operating the switch 313a in the PO PPM 313 after another specific period of time elapses from each operation of the switch 213a.

When the switch 213a in the MO PPM 213 receives each trigger signal transmitted from the controller 230, discharge may occur between the electrodes 211a and 211b in the MO laser chamber 210.

When the discharge occurs between the electrodes 211a and 211b in the MO laser chamber 210, the laser gas may be excited, and the excited laser gas emits light. By resonating the light between the MO OC 215 and the LNM 214, laser oscillation may be occurred. A part of the light narrowed by the prism 214a and the grating 214b may output through the MO OC 215. The beam splitter 217a may reflect a part of the outputted laser beam, the optical sensor 217c of the MO energy monitor unit 217 may measure energy of the reflected laser beam, and the controller 230 may calculate pulse energy Emo being a corresponding value from the measured energy. A value of the energy measured by the optical sensor 217c may be transmitted to the controller 230.

The laser beam (seed laser beam) having been outputted from the MO 200 and passed through the beam splitter 217a may be reflected by the high reflection mirrors 261 and 262, and enter the partial reflection minor 318 installed in the PO 300.

The partial reflection minor 318 may transmit a part of the incident laser beam, and the transmitted laser beam may enter a space between the electrodes 311a and 311b in the PO laser chamber 310. At the timing when the laser beam having been outputted from the MO 200 and passed through the partial reflection minor 318 exists in the space between the electrodes 311a and 311b in the PO laser chamber 310, the laser gas may be excited by generating discharge between the electrodes 311a and 311b in the PO laser chamber 310.

Thereby, the laser beam entering the PO 300 may be amplified, an amplified laser beam may be outputted from the PO OC 315. The beam splitter 317a may reflect a part of the outputted laser beam, the optical sensor 317c of the PO energy monitor unit 317 may measure energy of the reflected laser beam, and the controller 230 may calculate pulse energy Epo being a corresponding value from the measured energy. A value of the energy measured by the optical sensor 317c may be transmitted to the controller 230.

In control of the charge voltage Vhvmo in the MO 200, based on a difference between specific pulse energies Emot and Emo, the charge voltage Vhvmo may be feedback-controlled so that pulse energy of a next pulse laser beam outputted from the MO 200 is close to the specific pulse energy Emot.

In control of the charge voltage Vhvpo in the PO 300, based on a difference between specific pulse energies Et and Epo, the charge voltage Vhvpo may be feedback-controlled so that pulse energy of a next pulse laser beam outputted from the PO 300 is close to the specific pulse energy Et.

The controller 230 may estimate a lifetime of an optical element, or the like, in the MO 200 based on the pulse energy Emo in the MO 200.

The controller 230 may estimate lifetimes of optical elements, or the like, in the PO 300 based on the pulse energy Epo in the MO 300.

Furthermore, when the chamber having been installed in the MO 200 is installed in the PO 300, the controller 230 may estimate lifetimes of optical elements based on the pulse energies Emo and Epo.

In such case, even when the chamber is moved from the MO 200 to the PO 300, it is possible to estimate lifetimes of optical elements accurately.

Here, pulse energy Epo is about ten times as large as pulse energy Emo. Therefore, because irradiation of laser beams with the pulse energy Epo to an optical element lets fluence become extremely large, two-photon absorption may become dominative.

For example, because low energy of laser beams entering an optical element lets fluence become low, single photon absorption tends to become easily dominative. The optical element to be irradiated with the low energy laser beams may be an optical element used for the MO 200. Particularly, examples thereof may include the prism 214a and the grating 214b in the LNM 214, and the beam splitter 217a and the collector lens 217b in the MO energy monitor unit 217, and the like.

Furthermore, because high energy of laser beams entering an optical element lets fluence become high, two-photon absorption tends to become easily dominative. The optical element to be irradiated with the high energy laser beams may be an optical element used for the PO 300. Particularly, examples may include the windows 310a and 310b in the PO laser chamber 310, and the PO OC 315, and the like.

3.3 Specific Lifetime Estimation Method of Double Chamber System

Figure 13:
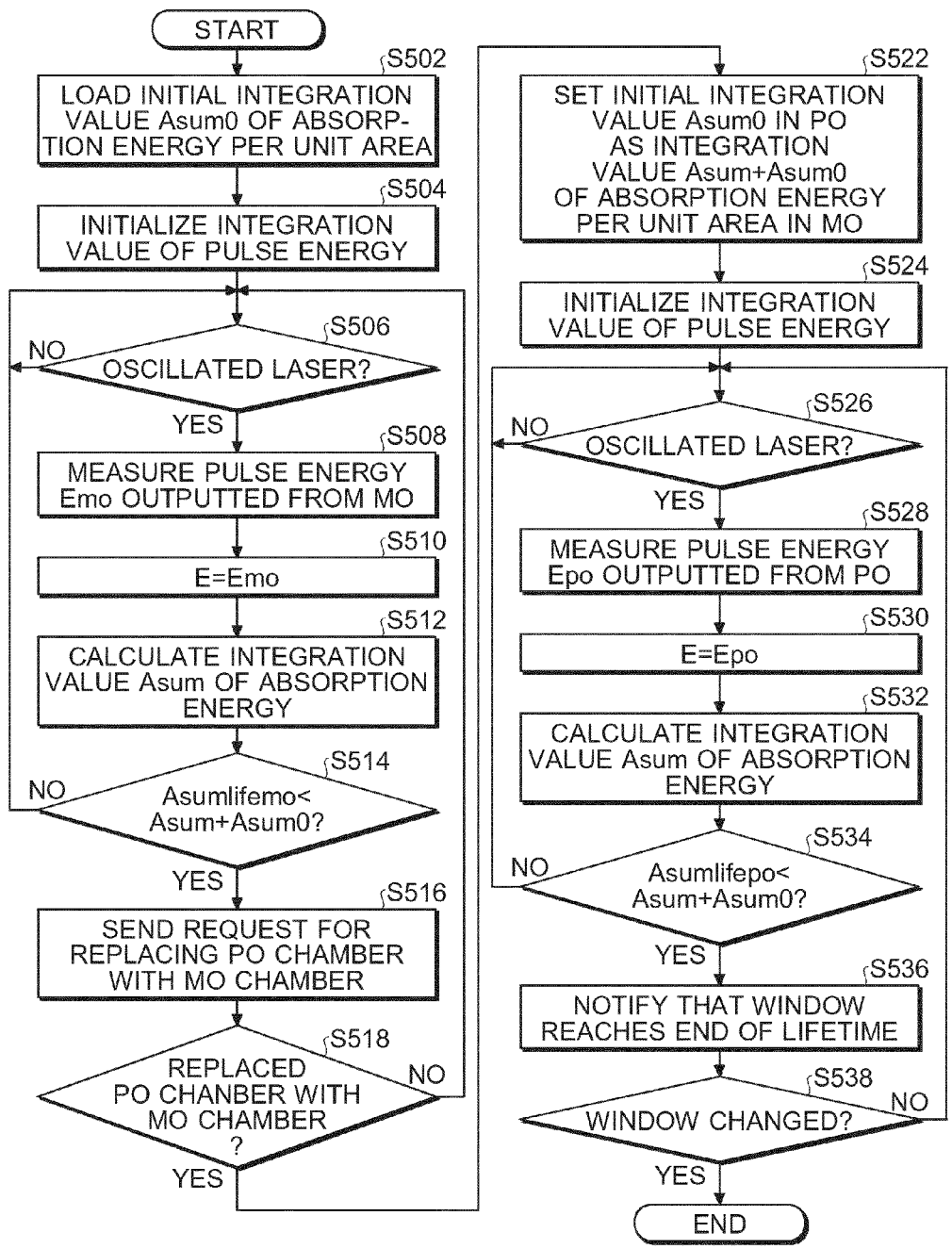
FIG. 13 is a flowchart for explaining a control method of the double chamber laser apparatus according to the disclosure.

Using FIG. 13, a specific lifetime estimation method of optical elements in the double chamber excimer laser apparatus included in a control method of the laser apparatus will be explained. A main part of the specific lifetime estimation method of optical elements in the double chamber excimer laser apparatus is that one of the lifetime estimation methods of optical elements described with reference to FIGS. 4 to 6 is applied to the MO 200 and the PO 300. In the following, as an example, a case where an optical element being a target of the lifetime estimation is the window 210b, or the like, will be explained.

Firstly, in step S502, the controller 230 may load an initial integration value of absorption energy per unit area at the window 210b, or the like, in the MO laser chamber 210, and define the loaded initial integration value of absorption energy per unit area as Asum0. When the MO laser chamber 210 has been used in other laser apparatuses, for instance, the loaded initial integration value of absorption energy per unit area may be an integration value of absorption energy per unit to date at the window 210b, or the like. When the MO laser chamber 210 is new, the initial integration value of absorption energy per unit area Asum0 which is set at the start may be set as 0 (Asum0=0).

Then, in step S504, the controller 230 may initialize integration values of pulse energy. Specifically, as the same with the case shown in FIG. 4, when the lifetime of the window 210b is influenced from both single photon absorption and two-photon absorption, the controller 230 may set pulse energies Esum1 and Esum2 as 0, respectively (Esum1=0, Esum2=0). Furthermore, as the same with the case shown in FIG. 5, when single photon absorption dominantly influences the lifetime of the window 210b, the controller 230 may set pulse energy Esum1 as 0 (Esum1=0). Moreover, as the same with the case shown in FIG. 6, when two-photon absorption dominantly influences the lifetime of the window 210b, the controller 230 may set pulse energy Esum2 as 0 (Esum2=0).

Then, in step S506, the controller 230 may apply a voltage between the electrodes 211a and 211b in the MO laser chamber 210, and determine whether laser oscillation occurs or not. When the controller 230 determines that the laser oscillation occurs, the controller 230 may progress to step S508. On the other hand, when the controller 230 determines that the laser oscillation does not occur, the controller 230 may execute step S506 again. The determination whether the laser oscillation occurs may be executed based on whether a trigger signal is transmitted to the switch 213a, or whether the MO energy monitor unit 217 detects a laser beam, for instance.

Then, in step S508, the controller 230 may measure energy of a laser beam separated by the beam splitter 217a in a laser beam outputted from the MO laser chamber 210 using the optical sensor 217c, and calculate pulse energy Emo from the measured energy. The value of energy of the laser beam measured by the optical sensor 217c may be transmitted to the controller 230 from the optical sensor 217c.

Then, in step S510, the controller 230 may replace the pulse energy E with the pulse energy Emo of the laser beam obtained in step S508.

Then, in step S512, the controller 230 may calculate an integration value Asum of absorption energy per unit area at the window 210b based on the pulse energy E obtained in step S510. Specifically, when the lifetime of the window 210b is influenced from both single photon absorption and two-photon absorption, the controller 230 may execute the same steps S110 to S114 shown in FIG. 4. When single photon absorption dominantly influences the lifetime of the window 210b, the controller 230 may execute the same steps S210 and S212 shown in FIG. 5. When two-photon absorption dominantly influences the lifetime of the window 210b, the controller 230 may execute the same steps S310 and S312 shown in FIG. 6.

Then, in step S514, the controller 230 may determine whether a sum of the integration value Asum of absorption energy per unit area and the initial integration value Asum0 exceeds the lifetime integration value Asumlifemo of the window 210b in the MO 200 or not. The lifetime integration value Asumlifemo may set arbitrarily on the basis that the MO laser chamber 210 will be used as the PO laser chamber 410 next. When the controller 230 determines that the Asum+Asum0 exceeds the Asumlifemo, the controller 230 may progress to step S516. On the other hand, when the controller 230 determines that the Asum+Asum0 does not exceed the Asumlifemo, the controller 230 may return to step S506.

Then, in step S516, the controller 230 may transmit a request for replacing the PO laser chamber 310 with a chamber used as the MO laser chamber 210 to an external device. Accordingly, the chamber used as the MO laser chamber 210 is moved to a position of the PO laser chamber 310.

Then, in step S518, the controller 230 may determine that the PO laser chamber 310 is replaced with the chamber used as the MO laser chamber 210 or not. When the controller 230 determines that the PO laser chamber 310 is replaced with the chamber used as the MO laser chamber 210, the controller 230 may progress to step S522. On the other hand, when the controller 230 determines that the PO laser chamber 310 is not replaced with the chamber used as the MO laser chamber 210, the controller 230 may return to step S506.

Then, in step S522, the controller 230 may define a sum of the integration value Asum of absorption energy per unit area at the window 210b, or the like, in the MO laser chamber 210 and the initial integration value Asum0 as an initial integration value Asum0 of absorption energy per unit area at the window 310b, or the like, in the PO laser chamber 310. Here, in this case, because the PO laser chamber 310 is replaced with the chamber used as the MO laser chamber 210, the chamber used as the MO laser chamber is the same as the chamber currently used for the PO laser chamber 310. However, for the purpose of illustration, difference reference numbers are assigned to these chambers.

Then, in step S524, the controller 230 may initialize integration values of pulse energy. Specifically, as the same with the case shown in FIG. 4, when the lifetime of the window 310b is influenced from both single photon absorption and two-photon absorption, the controller 230 may set pulse energies Esum1 and Esum2 as 0, respectively (Esum1=0, Esum2=0). Furthermore, as the same with the case shown in FIG. 5, when single photon absorption dominantly influences the lifetime of the window 310b, the controller 230 may set pulse energy Esum1 as 0 (Esum1=0). Moreover, as the same with the case shown in FIG. 6, when two-photon absorption dominantly influences the lifetime of the window 310b, the controller 230 may set pulse energy Esum2 as 0 (Esum2=0).

Then, in step S526, the controller 230 may apply a voltage between the electrodes 311a and 311b in the PO laser chamber 310, and determine whether laser oscillation occurs or not. When the controller 230 determines that the laser oscillation occurs, the controller 230 may progress to step S528. On the other hand, when the controller 230 determines that the laser oscillation does not occur, the controller 230 may execute step S526 again. The determination whether the laser oscillation occurs may be executed based on whether a trigger signal is transmitted to the switch 313a, or whether the PO energy monitor unit 317 detects a laser beam, for instance.

Then, in step S528, the controller 230 may measure energy of a laser beam separated by the beam splitter 317a in a laser beam outputted from the PO laser chamber 310 using the optical sensor 317c, and calculate pulse energy Epo from the measured energy. The value of energy of the laser beam measured by the optical sensor 317c may be transmitted to the controller 230 from the optical sensor 317c.

Then, in step S530, the controller 230 may replace the pulse energy E with the pulse energy Epo of the laser beam obtained in step S528.

Then, in step S532, the controller 230 may calculate an integration value Asum of absorption energy per unit area at the window 310b based on the pulse energy E obtained in step S530. Specifically, when the lifetime of the window 310b is influenced from both single photon absorption and two-photon absorption, the controller 230 may execute the same steps S110 to S114 shown in FIG. 4. When single photon absorption dominantly influences the lifetime of the window 310b, the controller 230 may execute the same steps S210 and S212 shown in FIG. 5. When two-photon absorption dominantly influences the lifetime of the window 310b, the controller 230 may execute the same steps S310 and S312 shown in FIG. 6.

Then, in step S534, the controller 230 may determine whether a sum of the integration value Asum of absorption energy per unit area and the initial integration value Asum0 exceeds the lifetime integration value Asumlifepo of the window 310b in the PO 300 or not. When the controller 230 determines that the Asum+Asum0 exceeds the Asumlifepo, the controller 230 may progress to step S536. On the other hand, when the controller 230 determines that the Asum+Asum0 does not exceed the Asumlifepo, the controller 230 may return to step S526.

Then, in step S536, the controller 230 may notify an external device that the PO laser chamber 310 reaches the end of its lifetime because the window 310b reaches the end of its lifetime. Instead of the notification to the external device, the controller 230 may display that on an operational panel, or the like, of the laser apparatus.

Then, in step S38, the controller 230 may determines whether the window 310b is replaced or not. When the controller 230 determines that the window 310b is replaced, the controller 230 may finish the operation of the lifetime estimation method of the window 310b. On the other hand, the controller 230 determines that the window 310b is not replaced, the controller 230 may return to step S526.

In the above-description, although the case where the chamber used as the MO laser chamber 210 is then used as the PO laser chamber 310 is explained, a case where a chamber used as the PO laser chamber 310 is then used as the MO laser chamber 210 is also possible.

The above-described embodiments and the modifications thereof are merely examples for implementing the present disclosure, and the present disclosure is not limited thereto. Making various modifications according to the specifications or the like is within the scope of the present disclosure, and other various embodiments are possible within the scope of the present disclosure. For example, the modifications illustrated for particular embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. A laser apparatus comprising:
   a laser chamber configured to include a laser gain medium;
   a pair of electrodes disposed in the laser chamber;
   an energy detector configured to measure pulse energy of laser beams outputted by discharging between the pair of the electrodes;
   an optical element disposed on a light path of the laser beams; and
   a controller configured to, with respect to the optical element, calculate a lifetime shot number with respect to the laser beams with the pulse energy based on the pulse energy of the laser beams, calculate a lifetime index value by integrating inverses of the respective calculated lifetime shot numbers, and determine whether the lifetime index value exceeds 1 or not.

2. A control method of a laser apparatus including:
   discharging a pair of electrodes for exciting a laser gain medium by applying voltages between the pair of the electrodes in order to output laser beams;
   measuring pulse energy of the outputted laser beams;
   calculating, with respect to an optical element disposed on a light path of the laser beams, a lifetime shot number with respect to the laser beams with the pulse energy based on the pulse energy of the laser beams;
   calculating a lifetime index value by integrating inverses of the respective calculated lifetime shot numbers; and
   determining whether the lifetime index value exceeds 1 or not.

3. The laser apparatus according to claim 1, wherein the lifetime shot number is calculated based on the pulse energy and an approximate function of the lifetime shot number.

4. The laser apparatus according to claim 1, wherein the lifetime shot number is calculated based on a range of the pulse energy.

5. The method according to claim 2, wherein the lifetime shot number is calculated based on the pulse energy and an approximate function of the lifetime shot number.

6. The method according to claim 2, wherein the lifetime shot number is calculated based on a range of the pulse energy.

* * * * *